United States Patent
Mano et al.

(10) Patent No.: US 10,418,617 B2
(45) Date of Patent: Sep. 17, 2019

(54) LAMINATE-TYPE POWER STORAGE ELEMENT AND MANUFACTURING METHOD THEREOF

(71) Applicant: FDK CORPORATION, Tokyo (JP)

(72) Inventors: Tsukasa Mano, Tokyo (JP); Daisuke Hirata, Tokyo (JP); Naoaki Nishimura, Tokyo (JP); Yuya Iida, Tokyo (JP); Ryuji Ito, Tokyo (JP)

(73) Assignee: FDK Corporation, Tokyo (JP)

( * ) Notice: Subject to any disclaimer, the term of this patent is extended or adjusted under 35 U.S.C. 154(b) by 47 days.

(21) Appl. No.: 15/416,644

(22) Filed: Jan. 26, 2017

(65) Prior Publication Data
US 2017/0214032 A1  Jul. 27, 2017

(30) Foreign Application Priority Data

Jan. 27, 2016 (JP) .................. 2016-012988

(51) Int. Cl.
| | |
|---|---|
| *H01M 2/02* | (2006.01) |
| *H01M 2/32* | (2006.01) |
| *H01M 6/02* | (2006.01) |
| *H01M 2/30* | (2006.01) |

(52) U.S. Cl.
CPC ............. *H01M 2/32* (2013.01); *H01M 2/021* (2013.01); *H01M 2/30* (2013.01); *H01M 6/02* (2013.01); *H01M 2220/30* (2013.01)

(58) Field of Classification Search
CPC .......... H01M 2/32; H01M 2/021; H01M 2/30; H01M 6/02; H01M 2220/30
See application file for complete search history.

(56) References Cited

U.S. PATENT DOCUMENTS 6,632,538 B1 * 10/2003 Yamazaki ............. H01M 2/021
                                                            428/213

FOREIGN PATENT DOCUMENTS

| JP | 01045062 A * 2/1989 ............ H01M 2/023 |
| JP | 2006-281613    10/2006 |

OTHER PUBLICATIONS

FDK Corporation, "Thin Type Primary Lithium Batteries," [online], Internet <URL:http://www.fdk.co.jp/battery/lithium/lithium_thin.html>, (<URL:http://www.fdk.com/battery/lithium_e/lithium_thin.html>, in English.

* cited by examiner

*Primary Examiner* — Jane J Rhee
(74) *Attorney, Agent, or Firm* — Greer Burns & Crain, Ltd.

(57) ABSTRACT

A laminate-type power storage element, including an exterior body that is formed in a flat bag shape, and an electrode body that has a sheet-shaped positive electrode and a sheet-shaped negative electrode layered via a separator and that is sealed inside the exterior body together with an electrolytic solution, wherein electrode terminal plates of the positive electrode and the negative electrode are guided in an identical direction from a predetermined margin of the exterior body to an outside of the exterior body, and a support part that is made with a film shaped resin having insulating and heat-resistant properties is formed on principal surface sides of the electrode terminal plates at a region that is along the predetermined margin and covers up to tip ends of the electrode terminal plates.

4 Claims, 8 Drawing Sheets

LAMINATE-TYPE POWER STORAGE ELEMENT AND MANUFACTURING METHOD THEREOF

CROSS-REFERENCE TO RELATED APPLICATIONS

The present application claims priority from Japanese Patent Application No. 2016-12988 filed on Jan. 27, 2016, which is herein incorporated by reference.

BACKGROUND

Technical Field

Embodiments of this disclosure generally relate to a laminate-type power storage element that houses a power generating element in an exterior body formed of laminated films and a manufacturing method of the power storage element.

Related Art

As a form of a power storage element such as a primary battery, a secondary battery, and an electric double layer capacitor, there has been provided a laminate-type power storage element that seals a flat plate-shaped electrode body together with electrolytic solution in a flat-bag-shaped exterior body formed of laminated films. Since the laminate-type power storage element easily achieves both a large capacity and downsizing and thinning and is also excellent in heat radiation performance, the laminate-type power storage element has been conventionally used as a power supply for driving an electric vehicle, a hybrid vehicle, or a similar vehicle. Recently, utilizing the feature of being easily downsized and thinned, the laminate-type power storage element has been used as a power supply for an extremely thin electronic device (hereinafter, a thin electronic device) that incorporates a power supply, such as an IC card with a one-time password function and a display, an IC card with display, a tag, and a token (one-time password generator). Especially, an external dimension of a card type electronic device (card electronic device) compliant to a standard for IC card is specified by the standard, and the thinness is extremely thin, 0.76 mm. Therefore, the laminate-type power storage element is indispensable as a power supply for the card electronic device.

FIGS. 1A and 1B illustrate a general laminate-type power storage element. FIG. 1A is an external view of a laminate-type power storage element 1, and FIG. 1B is an exploded perspective view illustrating an outline of an internal structure of this power storage element 1. As illustrated in FIG. 1A, the laminate-type power storage element 1 has a flat plate-shaped appearance. An exterior body 11 formed of laminated films shaped into a flat rectangular bag internally seals a power generating element. In the laminate-type power storage element 1 illustrated here, distal end parts (24, 34) of a positive electrode terminal plate 23 and a negative electrode terminal plate 33 are guided in an identical direction from one side 13 of the rectangular exterior body 11.

Next, the following describes a schematic structure of the laminate-type power storage element 1 with reference to FIG. 1B. FIG. 1B hatches some members and portions for easy distinction from other members and portions. As illustrated in FIG. 1B, the exterior body 11 internally seals an electrode body 10 together with electrolytic solution. The electrode body 10 is formed by laminating a sheet-shaped positive electrode 20 and a sheet-shaped negative electrode 30 via a separator 40. The positive electrode 20 is formed by disposing a positive electrode material 22 containing a positive-electrode active material over one principal surface of a positive electrode current collector 21 made of a metal plate and a metal foil. The negative electrode 30 is formed by disposing a negative electrode material 32 containing a negative-electrode active material over one principal surface of a negative electrode current collector 31 made of a metal plate, a metal foil, or a similar material. The electrode body 10 is configured by laminating and press-bonding the positive electrode 20 and the negative electrode 30 such that the respective electrode materials (22, 32) are opposed via the separator 40 (or being welded to the separator 40). In this example, electrode terminal plates (23, 33), which are formed of a strip-shaped metal plate, metal foil, or similar material, are mounted to the respective electrode current collectors (21, 31) of the positive electrode 20 and the negative electrode 30. Further, the tab lead 2 is used as the electrode terminal plates (23, 33). As is well known, the tab lead 2 is structured such as using insulating resin sealing material (hereinafter, tab film 4) adhered in a manner sandwiching the terminal lead 3 on a portion of the extending strip-like terminal lead 3 that is made of such as a metal plate or a metal foil that are substantially the electrode terminal plates (23, 33). And one end portions 5 of the terminal leads 3 are exposed to the outside of the exterior body 11 as the distal end parts (24, 34) of the positive electrode terminal plate 23 and the negative electrode terminal plate 33. The other end portions are coupled to a part of the positive electrode current collector 21 and a part of the negative electrode current collector 31 by such as ultrasonic welding.

The exterior body 11 is configured by welding peripheral edge regions 12, which are hatched or indicated by the dotted line frame in the drawing, of two rectangular laminated films (11a, 11b), which are stacked to one another, by thermocompression bonding to seal the inside. As is well-known, the laminated films (11a, 11b) have a structure where one or more resin layers are laminated on front and back of a base material made of such as aluminum foil. Generally, the laminated films (11a, 11b) have a structure where a protecting layer made of, for example, a polyamide resin is laminated on one surface and an adhesive layer with thermal weldability made of, for example, a polypropylene is laminated on the other surface. When assembling the laminate-type power storage element, the two laminated films (11a, 11b) are made to oppose each other with the adhesive layer side facing inside and the electrode body 10 is disposed between the two laminated films (11a, 11b). Then the peripheral edge regions 12 of the mutual laminated films (11a, 11b) are thermocompression bonded to form a flat-bag-shaped exterior body 11. The tab films 4 of the tab leads 2 are thermowelded together with the laminated films (11a, 11b) on the edge side 13 to which the electrode terminal plates (23, 33) protrude on the peripheral edge region 12 of the exterior body 11 during the thermocompression bonding. Hereby, the tab films 4 welded to the terminal lead 3 are welded to the adhesive layer of the laminated films (11a, 11b) at this edge side 13.

Since the laminate-type power storage element is used as the power supply for electronic devices, the electrode terminal plates need to be coupled to an electronic circuit in the electronic device to incorporate the laminate-type power storage element into the electronic device. In other words, the laminate-type power storage element needs to be implemented to the substrate (circuit board) of the electronic circuit. Soldering, ultrasonic welding and the like can be given as methods for implementing the laminate-type power storage element. However, solder thickness control during soldering is difficult. When the laminate-type power storage element is used in for example, the above card electronic device, the solder may become thick at the implementation region so that the laminate-type power storage element may not be able to be incorporated into the card electronic device. On the other hand, the thickness of the implementation region would not present an issue with ultrasonic welding, since the electrode terminal plates themselves are directly welded to the predetermined print wiring part on the circuit board. However, since ultrasonic welding is associated with ultrasonic vibration caused by a large amount of energy creating frictional heat that melts the contact surface between the electrode terminal plates and the print wiring, the electrode terminal plates may be damaged or disconnected, depending on circumstances, in cases where the electrode terminal plates are formed with thin metal foils. Therefore, a method using an anisotropic conductive film (hereinafter also referred to as an ACF) has been widely employed as an implementation method for the laminate-type power storage element. As is well known, an ACF is a film-shaped component having a predetermined thickness used for implementation, and has a conductive property only in the thickness direction.

FIGS. 2A to 2D are schematic drawings illustrating the method to implement the laminate-type power storage element 1 illustrated in FIGS. 1A and 1B to an electronic circuit board using the ACF. FIGS. 2A to 2D illustrate the implementation procedure. FIGS. 2A to 2D are enlarged views in a cross section viewed from arrow a-a in FIG. 1A and illustrates a region near the electrode terminal plates (23, 33). First, as illustrated in FIG. 2A, the distal ends (24, 34) of the electrode terminal plates (23, 33) are guided to the outside of the exterior body 11 in the assembled laminate-type power storage element 1. The positive electrode terminal plate 23 and the negative electrode terminal plate 33 are disposed separately in a direction orthogonal to the plane of the paper in the drawing. As illustrated in FIG. 2B, a single ACF 70 is interposed between a power feeding terminal pad 61 and respective surfaces of the distal end sides (24, 34) of the electrode terminal plates (23, 33) of the positive electrode 20 and the negative electrode 30 (hereinafter also referred to as implementation surfaces 50). The power feeding terminal pad 61 is formed as a print wiring on a circuit board 60 such as a flexible printed circuit board (FPC) constituting the electronic circuit. That is, the one ACF 70, which extends in the direction orthogonal to the plane of the paper, is bridged across both electrode terminal plates (23, 33). As illustrated in the drawing, the implementation surfaces 50 of the electrode terminal plates (23, 33) are disposed to be lower surfaces and the relative up-down direction in the electrode terminal plates (23, 33) is specified. Then, as illustrated in FIG. 2C, the thermocompression bonding is performed from top surfaces (hereinafter also called back face 51) of the electrode terminal plates (23, 33) with, for example, a block-shaped jig 80 with a built-in heater. As illustrated in FIG. 2D, this couples the electrode terminal plates (23, 33) of the two positive and negative electrodes to the power feeding terminal pad 61 on the circuit board 60 via the one ACF 70.

The thickness of the implementation region can be kept stable with the implementation method using ACF and the electrode terminal plates would not be damaged with this method since vibration of the electrode terminal plates is not required, which is different from the case of ultrasonic welding. And the laminate-type power storage element can be implemented to the circuit board by the thermocompression bonding process having a sufficiently large coupling strength and a sufficiently small coupling resistance.

For example, Non-Patent Literature 1 (FDK CORPORATION, "Thin Type Primary Lithium Batteries," [online], [searched on Jan. 4, 2016], Internet <URL: http://www.fdk.co.jp/battery/lithium/lithium_thin.html> (<URL: http://www.fdk.com/battery/lithium_e/lithium_thin.html> in English)) describes a structure of the ACF, the implementation method using the ACF, or similar information. For example, Japanese Unexamined Patent Application Publication No. 2006-281613 discloses the structure of the laminate-type power storage element or similar information. The above Non-Patent Literature 1 describes features, discharge performance, and a similar specification of the thin lithium batteries, actually commercially available laminate-type power storage elements.

To implement the laminate-type power storage element to the electronic circuit using the ACF, in accordance with the up-down direction illustrated in FIG. 2B to FIG. 2D, the jig is pressed against the electrode terminal plates from above to couple the electrode terminal plates to the circuit board via the ACF. That is, the ACF is heated via the electrode terminal plates made of metal excellent in thermal conductivity. The ACF is thermally welded to the terminal pad or a similar member on the circuit board. And the jig that comes into contact with the top surfaces of the electrode terminal plates may reach up to a temperature of 200° C. during the thermocompression bonding. Hereby, the heat of the jig is transmitted to the electrode body inside the exterior body via the electrode terminal plates, possibly damaging the electrode body by a so-called temperature shock. In particular, the laminate-type power storage element used as the power supply of a small-sized thin electronic device represented by a card type electronic device has a high possibility of having the electrode body damaged by the heat of the jig rapidly transferring to the entire area of the small electrode body inside the exterior body via the electrode terminal plates during thermocompression bonding the ACF.

Thus as described in Non-Patent Literature 1, there is a laminate-type power storage element called a support-type laminate-type power storage element which has one of the two laminated films that configure the exterior body extended to the distal end regions of the electrode terminal plates. FIGS. 3A to 3C illustrate this support-type laminate-type power storage element 1s. Similar to FIGS. 2A to 2D, the up-down direction is defined with the side of the implementation surfaces 50 of the electrode terminal plates (23, 33) facing the downward direction and the front-rear direction is defined with the direction in which the electrode terminal plates (23, 33) are guided outside as the front direction, in the following. The direction that is orthogonal to both the up-down and the front-rear directions is defined as the right-left direction, where each of the right and the left directions are designated when viewed from the front toward the rear, as illustrated in FIGS. 3A to 3C. FIG. 3A is an external view of the support-type laminate-type power storage element is seen from above, FIG. 3B is a perspective view of the support-type laminate-type power storage element 1s seen from below and FIG. 3C is a drawing enlarging a part proximate the electrode terminal plates (23, 33) of a cross section viewed from arrow b-b in FIG. 3A.

As illustrated in FIGS. 3A to 3C, the support-type laminate-type power storage element is has the locations of the front margins (13a, 13b) from which the electrode terminal plates (23, 33) are guided outside differentiated at the respective laminated films (11a, 11b) that face each other. In the example illustrated in FIGS. 3A to 3C, the lower laminated film 11b, similar to a common laminate-type power storage element 1 illustrated in FIGS. 1A and 1B, has the front margin 13b thereof located where the electrode terminal plates (23, 33) are guided outside, whereas the upper laminated film 11a has the front margin 13a thereof located at a position that covers the entire region where the electrode terminal plates (23, 33) are formed. In other words, the upper laminated film 11a extends up to a location such that the entire region where the electrode terminal plates (23, 33) are formed is covered by the right and left margins 14. And a rectangular region (hereinafter also referred as support tab 15) that alone covers the back faces 51 of the electrode terminal plates (23, 33) is formed to the front margin 13b of the lower laminated film 11b. The electrode terminal plates (23, 33) and the ACF 70 are thermocompression bonded from above the support tab 15 as illustrated in FIG. 4 when implementing this support-type laminate-type power storage element 1s. Hereby, the electrode terminal plates (23, 33) do not come into direct contact with the jig 80 thereby keeping the temperature of the electrode terminal plates (23, 33) from rapidly rising and enabling the electrode body 10 from being damaged.

By the way, the support tab 15 is a part of the laminated film 11a and the side thereof that faces the back faces 51 of the electrode terminal plates (23, 33) has formed thereto an adhesive layer that melts by heat. And during thermocompression bonding, the adhesive layer of the support tab 15 comes into contact with the back face 51 of the electrode terminal plates (23, 33) and heat concentrates on the metal electrode terminal plates (23, 33) as well. Therefore, the region of the adhesive layer of the support tab 15 that comes into contact with the electrode terminal plates (23, 33) during thermocomporession bonding melts faster than the other regions so that the melting of the adhesive layer may reach up to the surface layer of the metal foil, which is the base of the laminated film 11a. When the adhesive layer of the laminated film 11a melts up to the surface layer of the metal foil in the region where the adhesive layer of the of the laminated film 11a comes into contact with the back faces 51 of the electrode terminal plates (23, 33), it is a matter of course that an external short-circuit would be developed between the electrode terminal plates (23, 33) of the positive electrode 20 and the negative electrode 30.

It is therefore an object of the present invention is to provide a laminate-type power storage element that does not have the electrode body damaged by a thermocompression bonding process and can certainly keep a short circuit from being generated between the electrode terminals, and a manufacturing method of the laminate-type power storage element.

SUMMARY

Disclosed embodiments for achieving the above object is a laminate-type power storage element, including
an exterior body that is formed in a flat bag shape, and
an electrode body that has a sheet-shaped positive electrode and a sheet-shaped negative electrode layered via a separator and that is sealed inside the exterior body together with an electrolytic solution, wherein
electrode terminal plates of the positive electrode and the negative electrode are guided in an identical direction from a predetermined margin of the exterior body to an outside of the exterior body, and a support part that is made with a film shaped resin having insulating and heat-resistant properties is formed on principal surface sides of the electrode terminal plates at a region that is along the predetermined margin and covers up to tip ends of the electrode terminal plates.

Further, the support part is formed with resin having a moisture barrier property and covers in the predetermined margin a region where the electrode terminal plates are guided outside. And it is further preferable that the laminate-type power storage element according is used as a power supply of a card type electronic device incorporating an electronic circuit and the power supply.

Furthermore, the manufacturing method of the above described laminate-type power storage element also falls within the scope of the present disclosure, wherein the method of manufacturing a laminate-type power storage element includes
preparing a laminate-type power storage element body that has an electrode body having a sheet-shaped positive electrode and a sheet-shaped negative electrode layered via a separator and an electrolytic solution sealed inside an exterior body that is formed in a flat bag shape, and that has electrode terminal plates of the positive electrode and the negative electrode guided in an identical direction from a predetermined margin of the exterior body to an outside,
applying on a release sheet a resin that has insulating and heat-resistant properties and that is in an unhardened state,
bridging the release sheet across the two electrode terminal plates of the positive and the negative electrodes in the power storage element body while making a face to which the resin is applied oppose principal surfaces of the electrode terminal plates and making the principal surfaces of the electrode terminal plates come into intimate contact with the face to which the resin is applied,
hardening the resin while the principal surfaces of the electrode terminal plates are in states pressed against the face to which the resin is applied, and
separating the release sheet from the hardened resin to form a support part.

According to the laminate-type power storage element of the present disclosure, the electrode body can be kept from being damaged during implementation to the circuit board using thermocompression bonding technology and thus a short circuit can be certainly kept from being generated between the electrode terminals. Further, the above described laminate-type power storage element can be efficiently manufactured according to the manufacturing method according to the present disclosure. The other effects will be made obvious in the following description.

BRIEF DESCRIPTION OF THE DRAWINGS

For a more complete understanding of the present invention and the advantages thereof, reference is now made to the following description taken in conjunction with the accompanying drawings wherein.

DESCRIPTION OF EXEMPLARY EMBODIMENTS

Figure 1A:
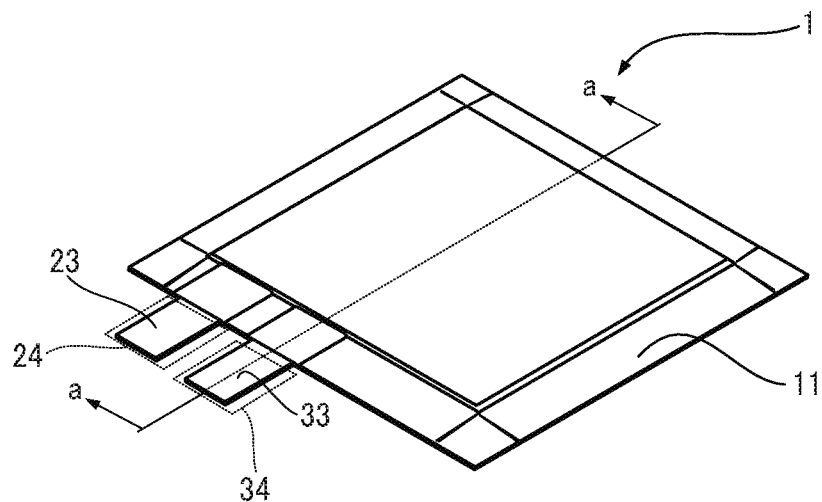
FIG. 1A is a drawing illustrating an example of a general laminate-type power storage element.

The following describes working examples of the present invention with reference to the attached drawings. Like reference numerals designate corresponding or identical elements in the drawings used for the following description, and therefore such elements may not be further elaborated. While a reference numeral is assigned to a part in a drawing, if unnecessary, the reference numeral may not be assigned to the corresponding part in another drawing.

Working Examples

Structure

Figure 1B:
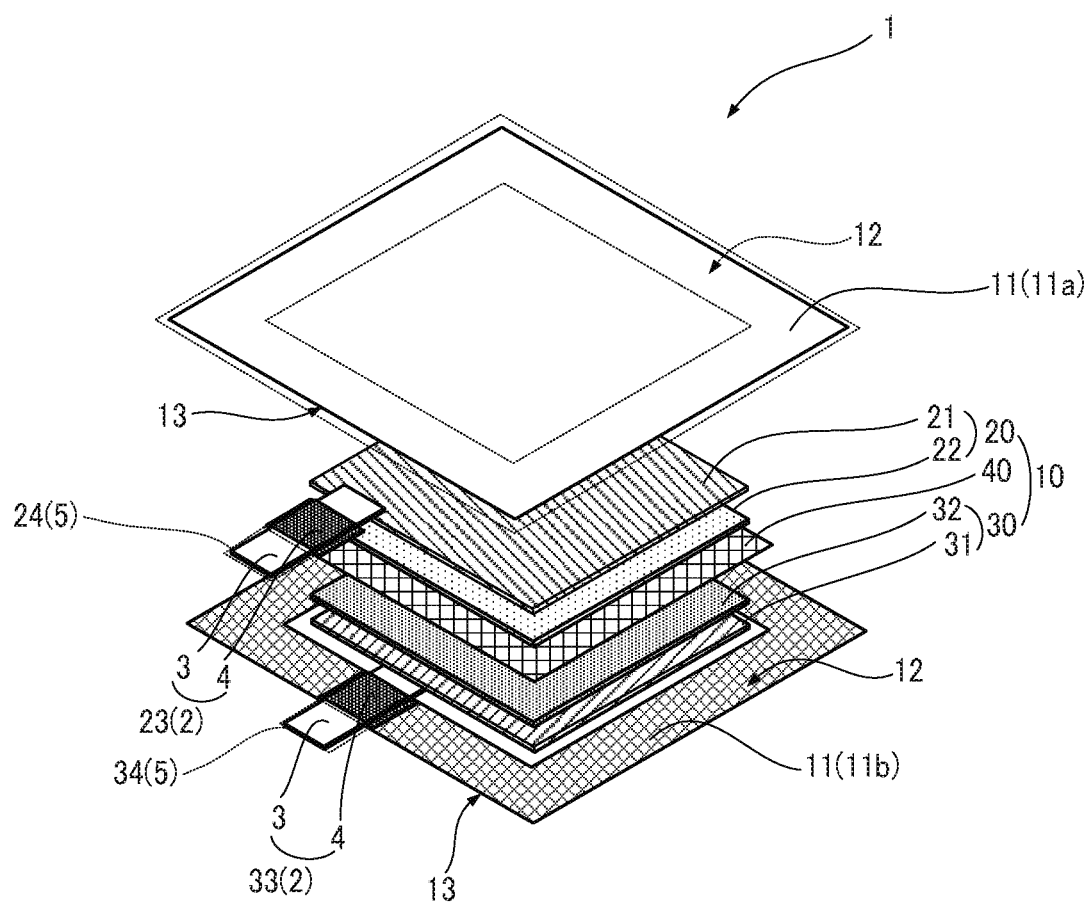
FIG. 1B is a drawing illustrating an example of a general laminate-type power storage element.
Figure 2A:
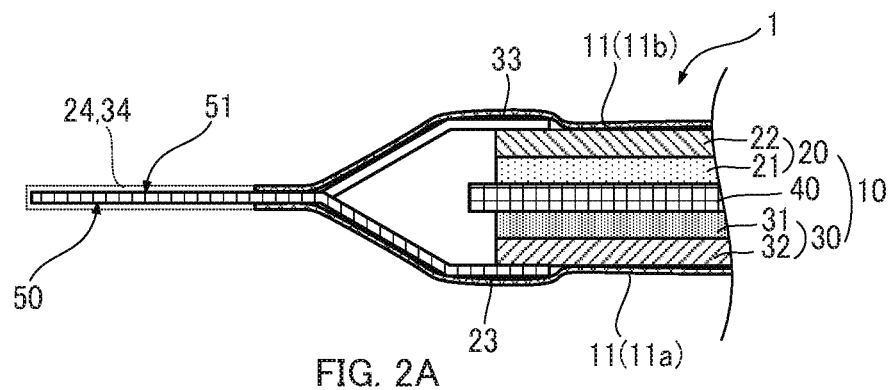
FIG. 2A is a drawing illustrating an implementation procedure for the laminate-type power storage element using an ACF.
Figure 2B:
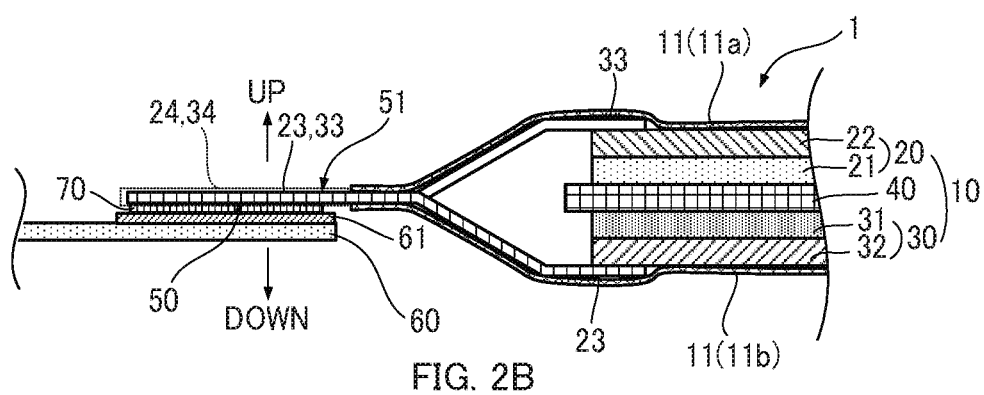
FIG. 2B is a drawing illustrating an implementation procedure for the laminate-type power storage element using an ACF.
Figure 2C:
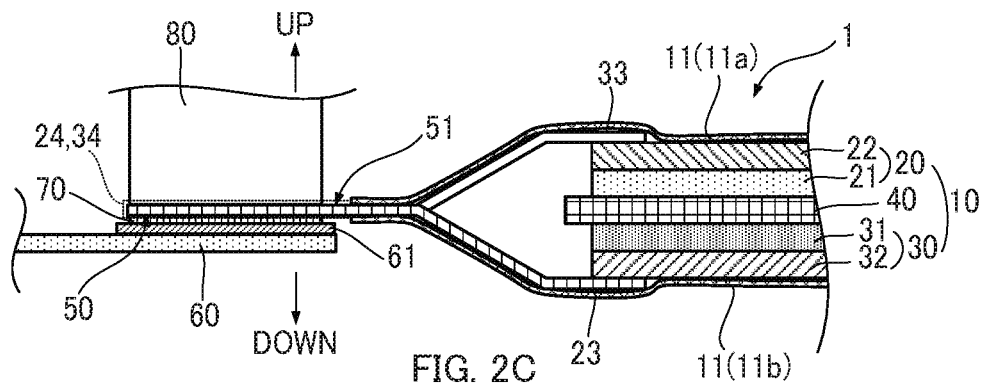
FIG. 2C is a drawing illustrating an implementation procedure for the laminate-type power storage element using an ACF.
Figure 2D:
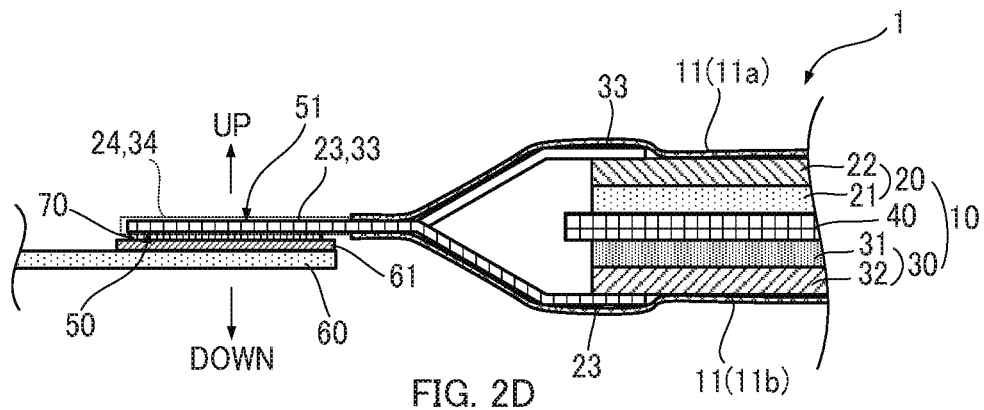
FIG. 2D is a drawing illustrating an implementation procedure for the laminate-type power storage element using an ACF.
Figure 3A:
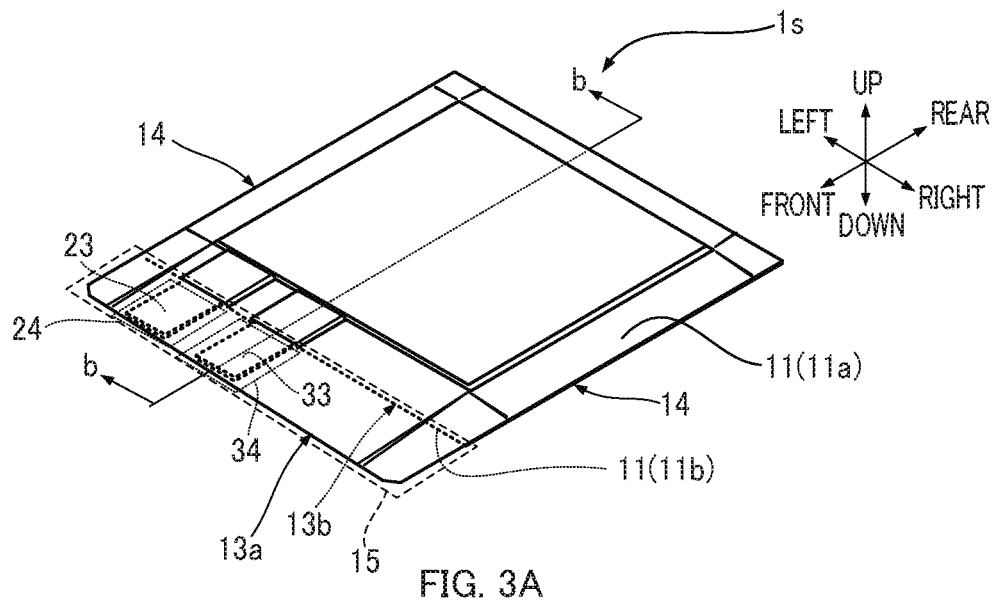
FIG. 3A is a drawing illustrating a support-type laminate-type power storage element.
Figure 3B:
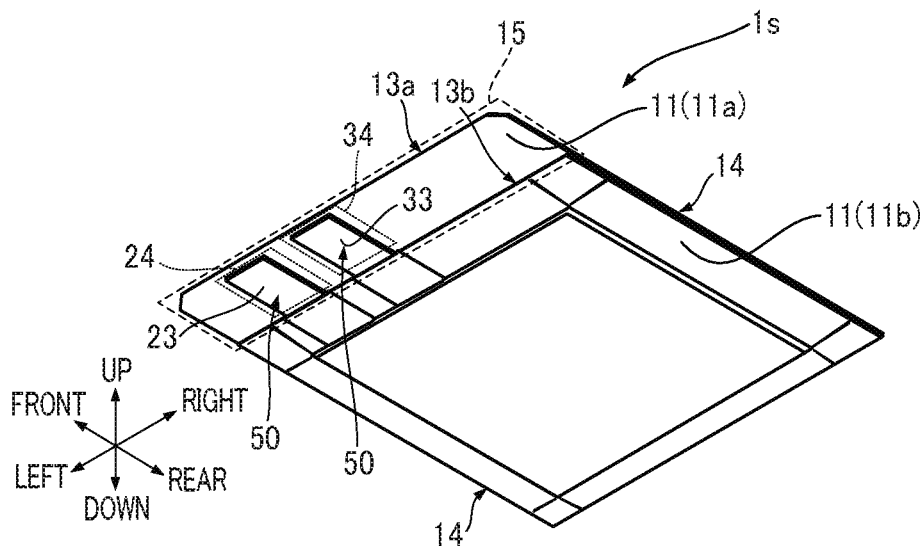
FIG. 3B is a drawing illustrating a support-type laminate-type power storage element.
Figure 3C:
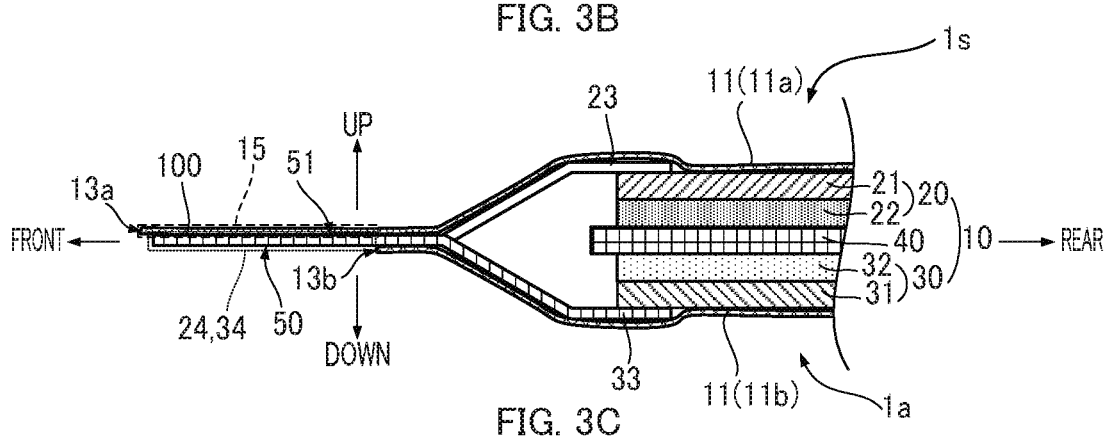
FIG. 3C is a drawing illustrating a support-type laminate-type power storage element.
Figure 4:
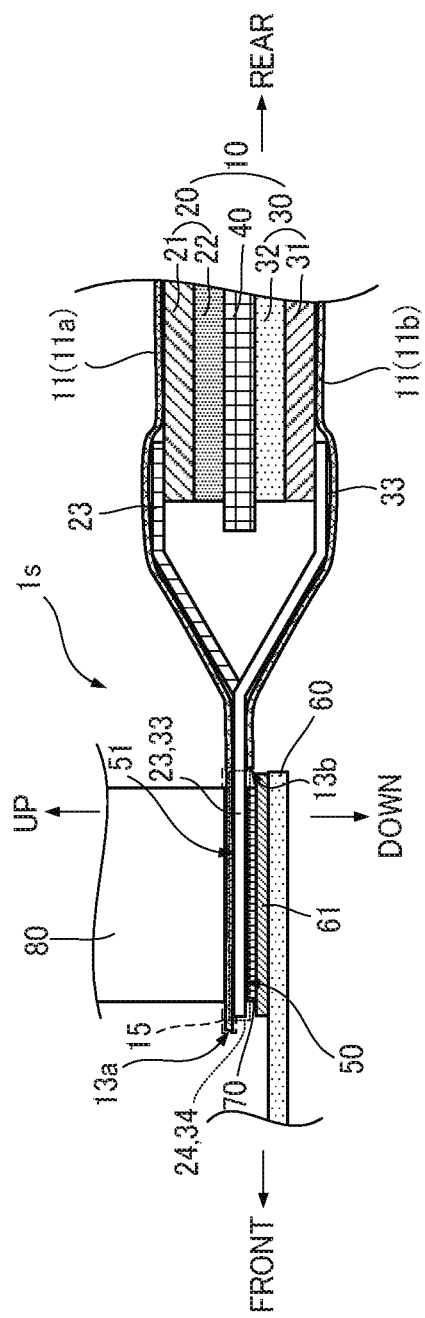
FIG. 4 is a drawing illustrating a method of implementing the support-type laminate-type power storage element.
Figure 5A:
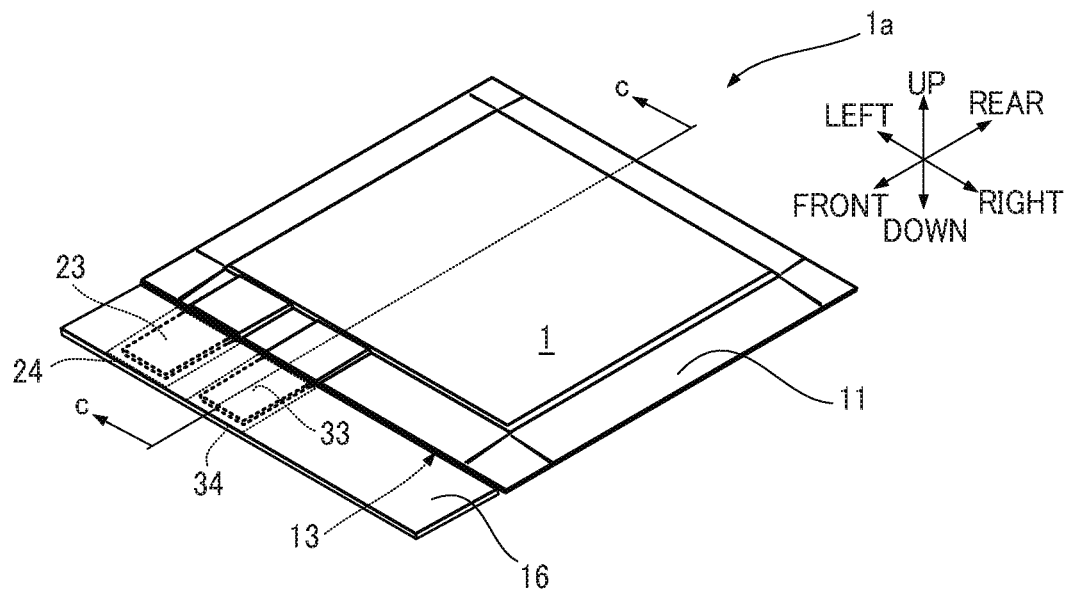
FIG. 5A is a drawing illustrating an external view of a laminate-type power storage element according to a working example of the present invention.
Figure 5B:
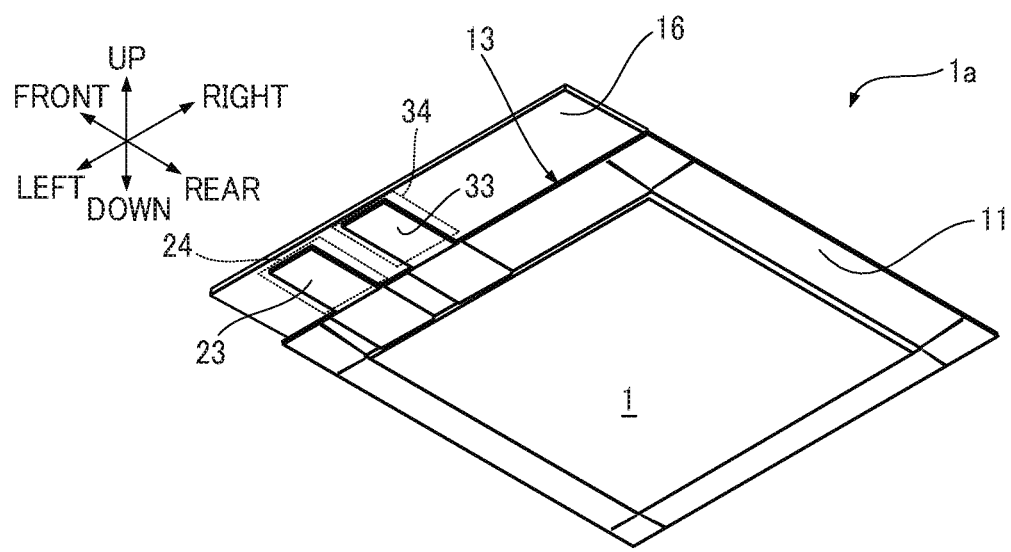
FIG. 5B is a drawing illustrating an external view of a laminate-type power storage element according to a working example of the present invention.
Figure 6A:
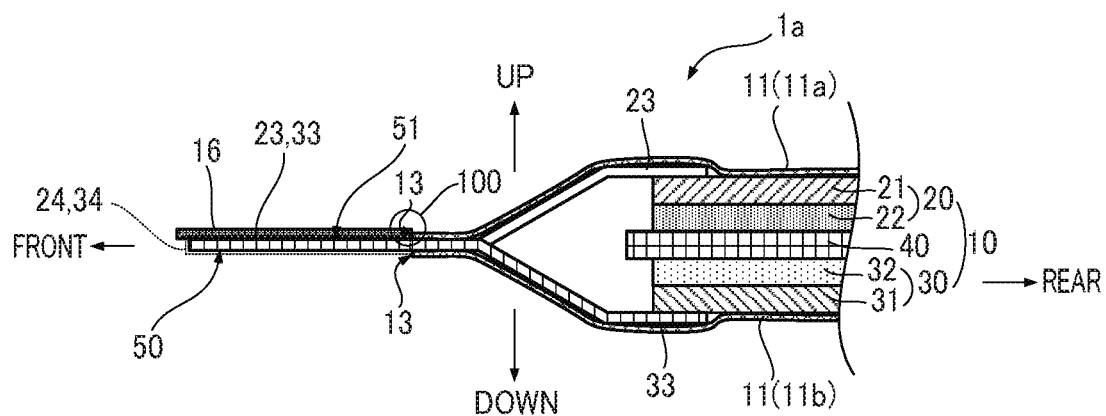
FIG. 6A is a drawing illustrating a structure of a laminate-type power storage element according to a working example of the present invention.
Figure 6B:
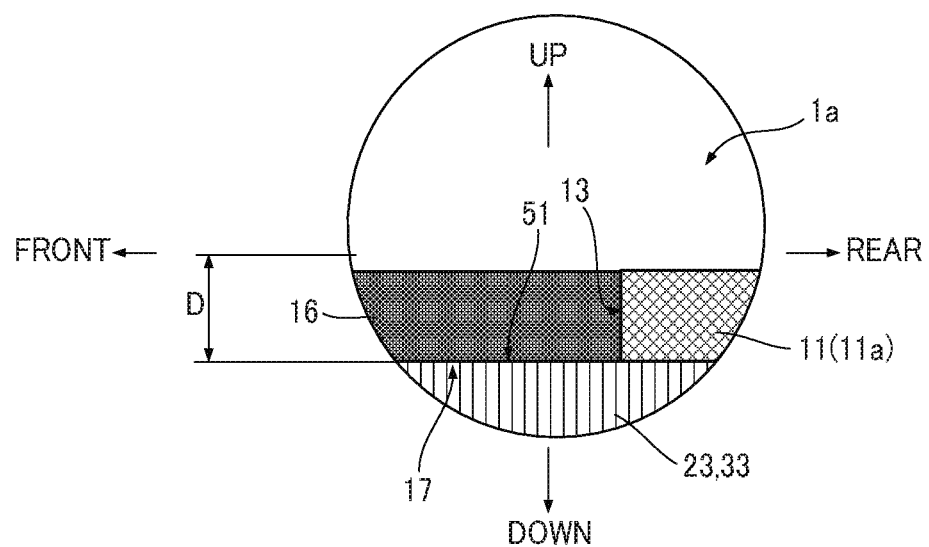
FIG. 6B is a drawing illustrating a structure of a laminate-type power storage element according to a working example of the present invention.

The laminate-type power storage element (hereinafter referred as power storage element) according to a working example of the present invention has a special configuration that serves in place of a support tab and is made to keep the electrode body from being damaged by a thermocompression bonding process as well as a short-circuit from being generated between the electrode terminals with this unique configuration. The inner structure of the power storage element according to the working example is similar to that of the power storage element 1 illustrated in FIG. 1B. FIGS. 5A, 5B, 6A and 6B illustrate a laminate-type power storage element (hereinafter also referred to as a power storage element 1a) according to the working example of the present invention. The following has each of the up-down, front-rear and right-left directions defined similar to FIGS. 3A to 3C. FIG. 5A is an external view of the power storage element 1a when seen from above and FIG. 5B is an external view of the power storage element 1a when seen from below. FIG. 6A is a drawing enlarging a front side of a cross section viewed from arrow c-c in FIG. 5A and FIG. 6B is a drawing enlarging the parts inside the circle 100 in FIG. 6A. As illustrated in FIGS. 5A and 5B, the power storage element 1a according to the working example includes a power storage element body 1 that has a structure similar to a common laminate-type power storage element 1 that does not have a support tab, which is shown in FIGS. 1A and 1B above. The back face side of the electrode terminal plates (23, 33) of this power storage element 1 has formed thereto a region (hereinafter also called support part 16) made of a rectangular film like heat-resistant resin (e.g., epoxy-based resin) that does not melt under a temperature of thermocompression bonding during implementation. The region is formed along a width that is substantially same as the width along the right and left direction of the exterior body 11.

Manufacturing Method

Figure 7A:
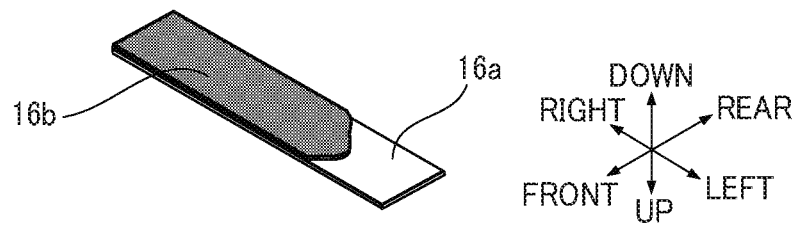
FIG. 7A is a drawing illustrating a manufacturing method of the laminate-type power storage element according to a working example of the present invention.
Figure 7B:
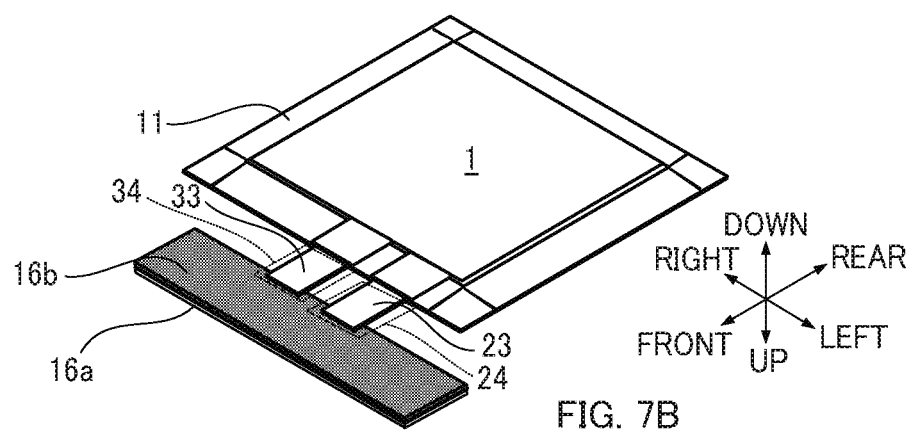
FIG. 7B is a drawing illustrating a manufacturing method of the laminate-type power storage element according to a working example of the present invention.
Figure 7C:
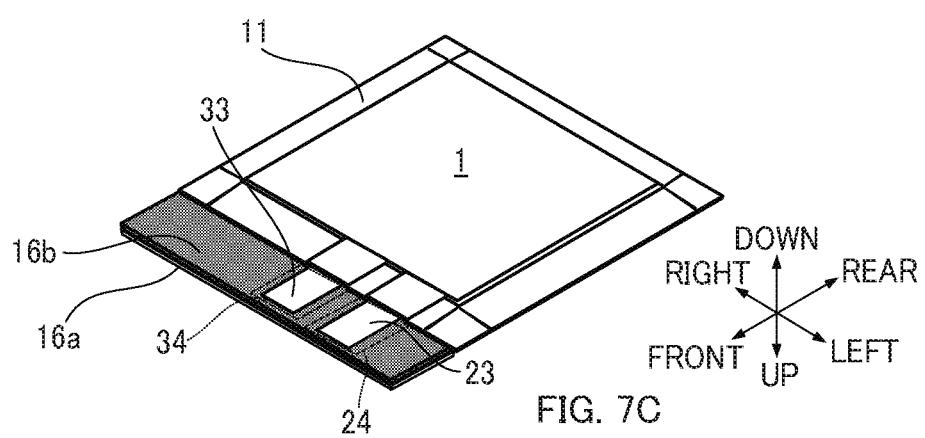
FIG. 7C is a drawing illustrating a manufacturing method of the laminate-type power storage element according to a working example of the present invention.
Figure 7D:
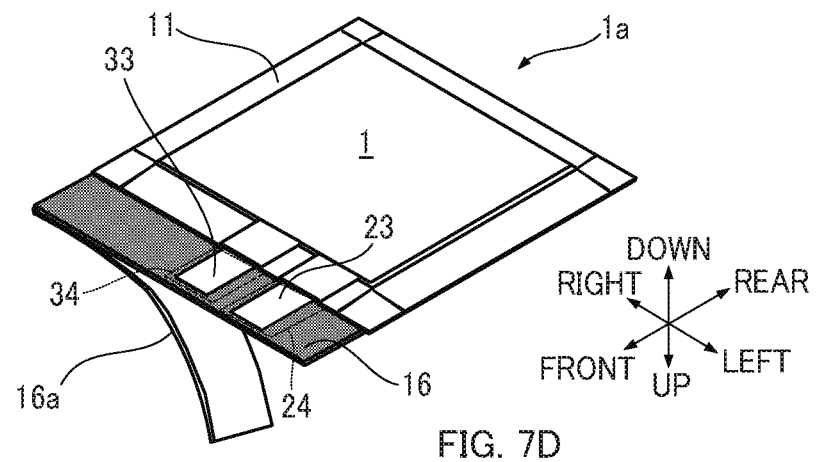
FIG. 7D is a drawing illustrating a manufacturing method of the laminate-type power storage element according to a working example of the present invention.

The following gives a description of the method of manufacturing the power storage element 1a. FIGS. 7A to 7D illustrate this manufacturing method where the manufacturing procedures are shown. As illustrated in FIG. 7A, an insulating paste-form heat-resistant resin (e.g., epoxy resin) is applied by screen printing or the like to the surface of the release sheet 16a having a contour similar to the support part and formed of such as fluorinated resin. Then as illustrated in FIG. 7B, the release sheet 16a is disposed to the back face 51 sides of the electrode terminal plates (23, 33) of the power storage element body 1 in a manner having the application face of the heat-resistant resin 16b face the back face 51 sides. Here, the release sheet 16a is positioned to accord with the region where the support part 16 is to be formed and the back faces 51 of the electrode terminal plates (23, 33) are tightly adhered to the face where the heat-resistant resin 16b is applied, as illustrated in FIG. 7C. In this example, the back faces 51 of the electrode terminal plates (23, 33) is pushed against the face where the heat-resistant resin 16b is applied so that the surface layer portions of the back faces 51 of these electrode terminal plates (23, 33) are buried in the paste-form heat-resistant resin 16b. Then the heat-resistant resin in this state is thermally cured or melted and hardened by the thermoplastic characteristics, and thereafter the release sheet 16a is separated from the support part 16 that is made of heat-resistant resin formed in a film shape, as illustrated in FIG. 7D. Hereby, the power storage element 1a shown in FIG. 5 is completed.

The power storage element according to the present working example includes a support part made of insulating heat-resistant resin in this way. During the thermocompression bonding process, heat is transferred to the electrode terminal plates and the ACF layered to the lower surfaces thereof through this support part. For such reason, the temperatures of the electrode terminal plates do not rise rapidly so that damages to the electrode body inside the exterior body can be averted and an external short-circuit which had been issues in the conventional support-type laminate-type power storage element can be kept from being generated in principle.

=External Short Circuit=

Figure 8:
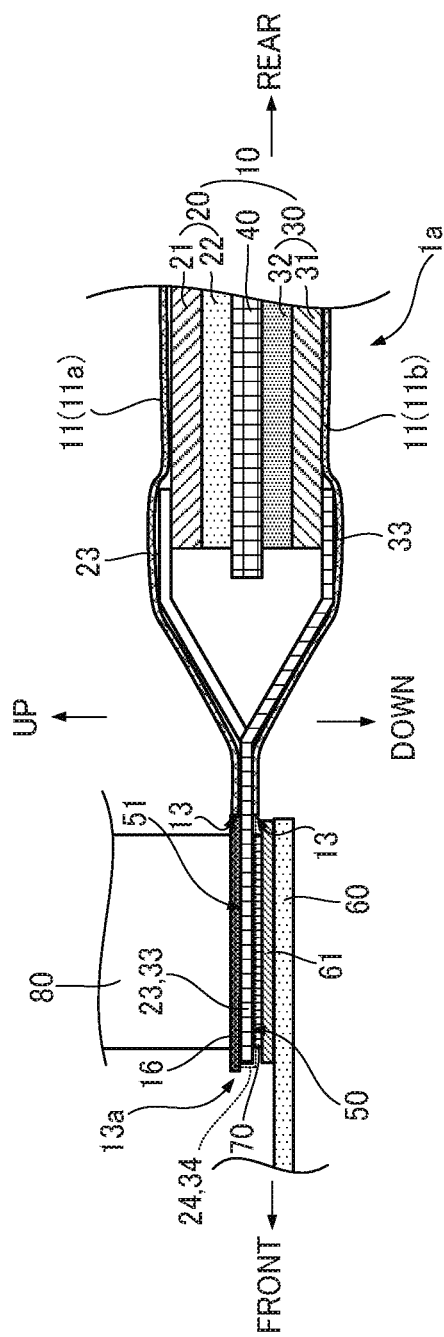
FIG. 8 is a drawing illustrating a method of implementing the laminate-type power storage element according to a working example of the present invention.

As mentioned above, in addition to the effect similar to a support-type laminate-type power storage element such that damages to the electrode body during thermocompression bonding is averted, the power storage element according to the working example achieves an effect that an external short-circuit which had been issues in the support-type laminate-type power storage element would not be generated. Therefore, in order to confirm that an external short-circuit caused by thermocompression bonding would not be generated to the power storage element according to the present working example, the power storage element according to the present working example (hereinafter, working example) and a conventional support-type laminate-type power storage element (hereinafter, comparative example) were assigned as samples and many of the respective samples were manufactured. The samples of the comparative example are support-type laminated lithium primary batteries (for example, CF052039(N) manufactured by FDK CORPORATION), which is disclosed as the product in the aforementioned Non-Patent Literature 1. And the samples of the working examples only differ to have formed a support part instead of a support tab and the configuration as a power storage element is completely the same as the comparative example. All the individual bodies were implemented on the circuit board under the same conditions (e.g., jig temperature of 170° C., pressure of 3 MPa and time of 8 secs.) The ACF 70 and the circuit board 60 are layered in this order to the electrode terminal plates (23, 33) from below and a heater incorporating jig 80 only need to be used to thermocompression bond from above the support part 16 when the power storage element 1a of the working example is implemented to the circuit board 60, as illustrated in FIG. 8. Then the voltages between the positive and negative electrodes were measured before and after implementation to confirm any existence of a voltage drop. 42% of the individual bodies of the samples of the comparative example showed some voltage drop whereas none of the samples of the working example showed a voltage drop.

Implementation Reliability

As described above, the power storage element according to the present example is implemented to the circuit board by thermocompression bonding via the support part made of insulating heat-resistant resin. Hereby, an external short-circuit can be certainly kept from being generated. However, even when an external short-circuit is not generated, if the implementation reliability, that is, the adhering strength between the circuit board and the electrode terminal plates were to decline, issues during actual use would arise. Therefore, the implementation reliability of the power storage elements according to the present working example was examined. Specifically, adhering strength tests were conducted on all of the individual manufactured samples of the working example and the samples of the comparative example in implemented states. A tensile tester was used for the adhering strength tests where the support part and the support tab were pulled in the separating direction with the circuit board fixed. The adhering strength (N) was measured when the electrode terminal plate separated from the circuit board. Results showed that the adhering strengths of the samples of the comparative example were within the range of 2N to 6N whereas the adhering strengths of the samples of the working example increased dramatically to be within the range of 8N to 16N. The reason for this is understood to be because the comparative example is thermocompression bonded from the top surface of the support tab being the laminate film itself that is substantially soft and whose surface is not so flat whereas the working example is thermocompression bonded from the top surface of the support part that is in a hardened state and very flat and is more rigid than the support tab. In other words, it is understood that the power storage element according to the working example is thermocompression bonded from above the support part that is very flat in a hardened state so that the heat of the jig is evenly transferred to the electrode terminal plates and into the face of the ACF that is positioned therebelow thereby improving the adhering strength. In this way, the power storage element according to the working example not only has an external short-circuit kept from being generated by the thermocompression bonding process but has the implementation reliability improved.

Other Working Examples

Both the thermoset resin and thermoplastic resin can be used as the resin material that configures the support part. Generally, thermoset resin has a better heat resistance property, however, thermoplastic resin may be used as long as the material does not melt during thermocompression bonding. Further, appropriate material such as epoxy resin, polyimide resin, acrylic resin, urethane resin, synthetic rubber resin, silicon resin can be adopted according to the specification or performance required to the power storage element. The laminate-type power storage element, for example, houses a power generating element in the exterior body having a structure formed by welding the peripheral edge regions of the opposing laminate films by thermocompression bonding. And this laminate-type power storage element had issues of having moisture easily entering in from the margin where the electrode terminal plates are guided outside. Therefore, the use of resin (e.g., epoxy resin) having a characteristic that does not allow moisture to pass through (moisture barrier property) into the support part is expected to solve the issues of the laminate-type power storage element having moisture passing through. In other words, the region, in the margins of the exterior body, where the electrode terminal plates are guided out is covered by resin material having a moisture barrier property when the support part is formed, hereby blocking the path to keep the moisture from entering therein.

The inner structure of the power storage element according to the working example of the present invention may have the configuration and the structure different from the ones illustrated in FIG. 1B that has been illustrated as a schematic diagram. For example, the electrode terminal plate may be configured of only a terminal lead. Alternatively, a strip-shaped region projecting from a region over which the electrode material is applied may be formed integrally with an electrode current collector to guide a distal end of the strip-shaped region to the outside of the exterior body. That is, the electrode current collector itself, which is referred to as the core, may also serve as the electrode terminal plate. Obviously, as long as the present invention has the structure that seals the flat plate-shaped electrode body with the laminated structure in the exterior body formed of the laminated films, the present invention is applicable to various kinds of laminate-type power storage elements (for example, a lithium secondary battery and an electric double layer capacitor) not limited to the lithium primary battery.

What is claimed is:
1. A laminate-type power storage element, comprising:
an exterior body that is formed in a flat bag shape; and an electrode body that has a sheet-shaped positive electrode and a sheet-shaped negative electrode layered via a separator and that is sealed inside the exterior body together
with an electrolytic solution, wherein
electrode terminal plates of the positive electrode and the negative electrode are guided in an identical direction from a predetermined margin of the exterior body to an outside of the exterior body such that levels of the electrode terminal plates on principal surface sides are made equal to each other, a support part that is made with a film shaped resin having insulating and heat-resistant properties is formed on the principal surface sides of the electrode terminal plates at a region that is along the predetermined margin and covers up to tip ends of the electrode terminal plates, so as to intersect the positive and negative electrodes, the support part being heated when the electrode terminal plates are implemented to a circuit board, and an anisotropic conductive film (ACF) is provided to a back face side of each of the principal surfaces of the electrode terminal plates, the anisotropic conductive film being thermally welded to an implementation surface of the circuit board when the laminate-type power storage element is implemented to the circuit board.

2. The laminate-type power storage element according to claim 1, wherein the support part is formed with resin having a moisture barrier property and covers in the predetermined margin a region where the electrode terminal plates are guided outside.

3. The laminate-type power storage element according to claim 1 that is used as a power supply of a card type electronic device incorporating an electronic circuit and the power storage element.

4. A method of manufacturing a laminate-type power storage element according to claim 1, comprising:

preparing a laminate-type power storage element body that has an electrode body having a sheet-shaped positive electrode and a sheet-shaped negative electrode layered via a separator and an electrolytic solution sealed inside an exterior body that is formed in a flat bag shape, and that has electrode terminal plates of the positive electrode and the negative electrode guided in an identical direction from a predetermined margin of the exterior body to an outside;

applying on a release sheet a resin that has insulating and heat-resistant properties and that is in an unhardened state;

bridging the release sheet across the two electrode terminal plates of the positive and the negative electrodes in the power storage element body while making a face to which the resin is applied oppose principal surfaces of the electrode terminal plates and making the principal surfaces of the electrode terminal plates come into intimate contact with the face to which the resin is applied;

hardening the resin while the principal surfaces of the electrode terminal plates are in states pressed against the face to which the resin is applied;

separating the release sheet from the hardened resin to form a support part; and applying the anisotropic conductive film to each of the principal surfaces of the electrode terminal plates.

* * * * *